Oct. 20, 1936.  E. G. CARROLL ET AL  2,057,706
BRAKE
Filed March 31, 1932  4 Sheets-Sheet 1

INVENTORS.
EUGENE G. CARROLL
JEROME B. COX
BY
Jerome B. Cox
ATTORNEY.

Oct. 20, 1936.  E. G. CARROLL ET AL  2,057,706
BRAKE
Filed March 31, 1932   4 Sheets-Sheet 2

INVENTORS.
EUGENE G. CARROLL
JEROME R. COX
BY
Jerome R. Cox
ATTORNEY.

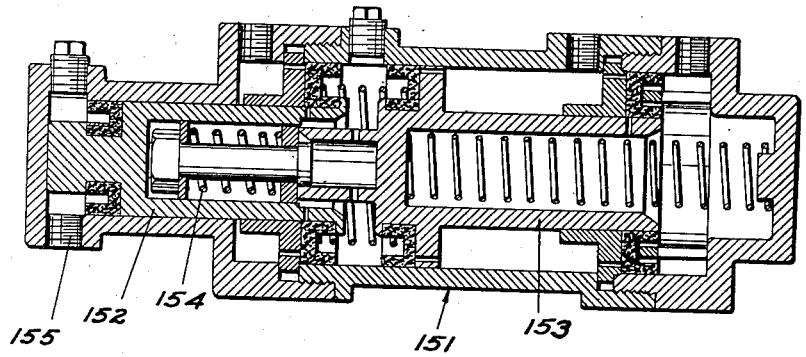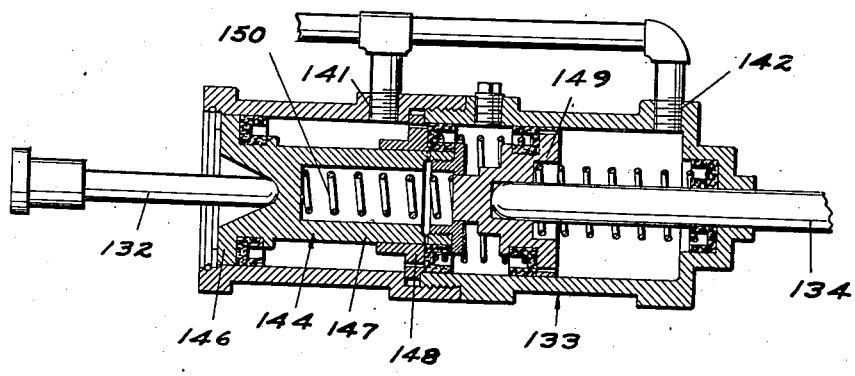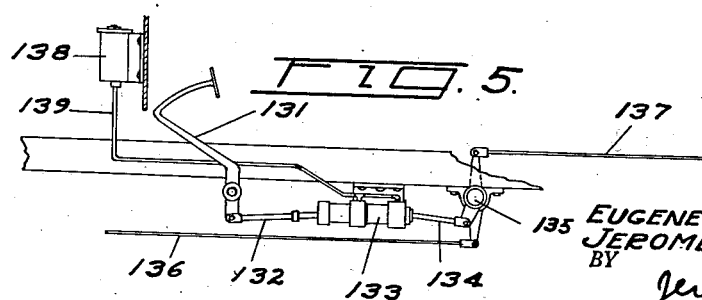

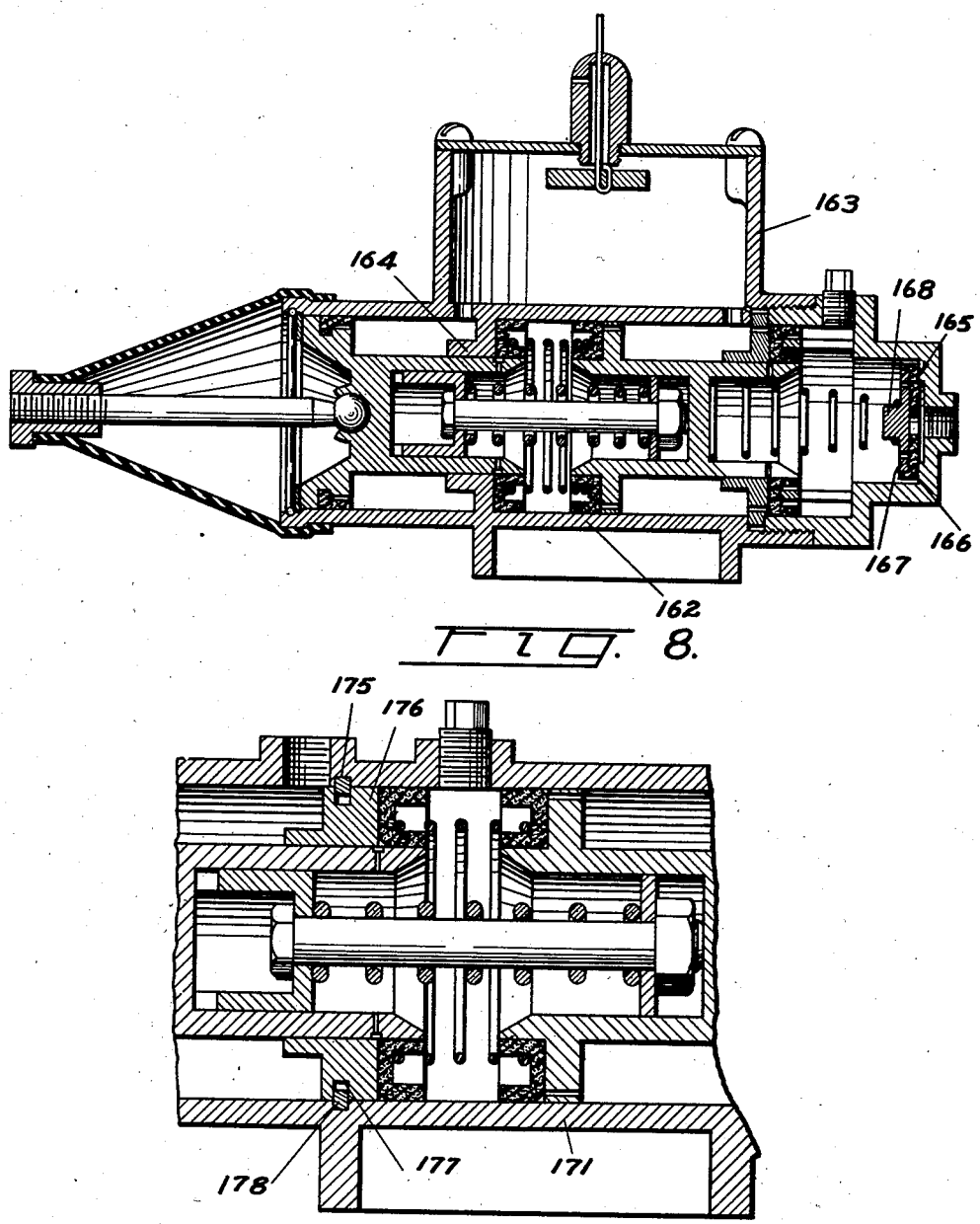

Patented Oct. 20, 1936

2,057,706

UNITED STATES PATENT OFFICE 2,057,706

BRAKE

Eugene G. Carroll and Jerome R. Cox, South Bend, Ind., assignors to Bendix Aviation Corporation, South Bend, Ind., a corporation of Delaware Application March 31, 1932, Serial No. 602,330

14 Claims. (Cl. 188—152)

This invention relates to brakes for automotive vehicles and more particularly to hydraulic brake systems.

Hydraulic brake systems designed for "two-phase" application in which relatively low ratios are used to move the shoes to the drum and in which relatively high ratios are used to force the shoes more tightly under relatively high pressure, have previously been proposed. The systems proposed can be classified into pressure sensitive and position sensitive systems. Usually the systems proposed have contemplated the use of a large area piston and a small area piston the large area piston or both pistons being adapted during the initial phase of the brake operation to force fluid to the brakes.

In the previously suggested pressure sensitive systems, it has usually been proposed to use a spring controlled relief valve adapted to open when a certain predetermined pressure is applied to the liquid and to allow liquid upon which the large area piston is acting to by-pass. In the second phase of operation, after the valve is opened, the small area piston is supposed to develop relatively high pressure to apply the brakes.

The systems previously proposed have been subject to many serious objections. The complication attendant upon the relief valve tends to make the systems unreliable. The spring of the valve reacts on the large piston and consequently upon the pedal, thus requiring the exertion of additional force which is wasted because it does not aid in applying the brake.

The position sensitive devices require continual adjustment in order that the high pressure phase shall correspond to the proper position of the shoes relative to the drums. Moreover, the feel of the pedal in all such prior art systems is objectionable due to the sudden jump from low to high pressure. Also because of the jump it is impossible to obtain braking pressures lying in the range between the pressures obtained by both pistons acting together at the maximum pedal pressure for this phase and the braking pressures obtained by the small area piston at the same pedal pressure.

One of the objects of this invention is to provide a reliable "two-phase" fluid pressure master cylinder or power device.

A further object is to provide a two phase hydraulic brake system free of objectionable and unreliable valve devices.

A further object is to provide such a system in which there is no lost energy.

A further object is to provide a novel automatic hydraulic power multiplying device.

A further object is to provide an automatic hydraulic power multiplying device for use in combination with a brake system whether the latter be mechanical or hydraulic.

A novel feature of the invention includes the provision of a master cylinder equipped with an operating plunger, a separate operator plunger, and a spring interposed between the plungers capable of being compressed by pressure, the operator plunger cooperating with the rear face of the operating plunger when the spring begins to compress under pressure to form a hydraulic power multiplying device in the nature of a hydraulic ram or press.

Further novel features relate to the provision of fixed annular heads through which the plungers extend; means for supplying fluid to all compartments of the cylinder; means for relieving excess pressure from all compartments when the parts are in their normal inoperative position; means for preventing the escape of fluid from ahead of the plunger; and locking means in the nature of a piston ring for holding the fixed head in place.

Further objects and features of the invention including novel details of construction of the cylinder head, plungers and other parts will be apparent after a reading of the subjoined specification and claims and after a consideration of the accompanying drawings in which:

Figure 5 is a diagrammatic view illustrating a mechanical braking system with a hydraulic booster or power multiplying device interposed in the mechanical linkage;

Figure 6 is a view in vertical section illustrating the booster cylinder of Figure 5 on a larger scale;

Figure 7 is a view on vertical section of a hydraulic booster adapted to be inserted in the line of a hydraulic system of ordinary construction;

Figure 8 is a view in vertical section of a combined reservoir, master cylinder and power multiplying device; and Figure 9 is a fragmentary view in vertical section of a modified detail of construction.

Figure 1:
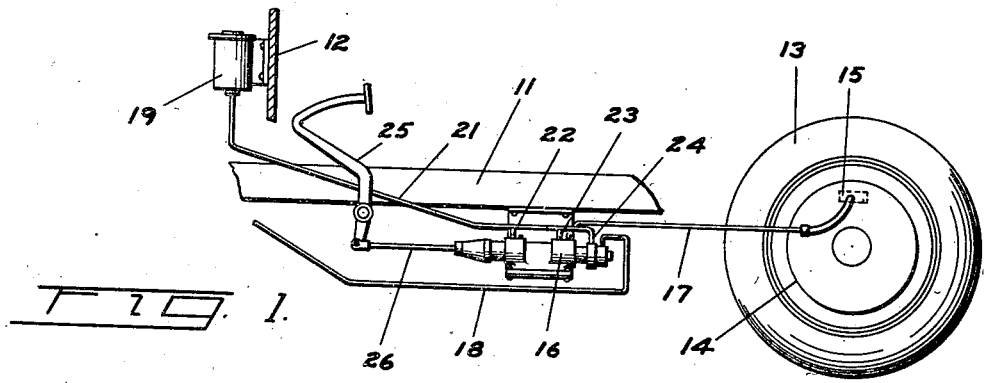
Figure 1 is a diagrammatic view illustrating a hydraulic braking system constructed according to my invention.

Referring particularly to the drawings for a detailed description of the illustrated embodiments and more particularly to Figure 1, there is shown a frame member 11 and a dash 12 both forming parts of the chassis of an automobile. Supporting the chassis are a plurality of road wheels such as the wheel 13 and mounted in each of the wheels are brakes such as the brake 14. Also mounted in the wheels are wheel cylinders such as the wheel cylinder 15 adapted to be operated by liquid pressure to actuate the brakes.

The wheel cylinders on the rear wheels are supplied with fluid under pressure from a master cylinder 16 through a conduit 17 and the front wheel cylinders are similarly supplied through a conduit 18. The master cylinder 16 is secured to the frame member 11 and is supplied with liquid from a reservoir 19 secured to the dash 12. Liquid going from the reservoir 19 to the master cylinder 16 passes through a conduit 21 and through branch conduits 22, 23, and 24. A pedal 25 pivotally mounted on the chassis of the automobile operates plungers in the master cylinder 16 through a piston rod 26.

Figure 2:
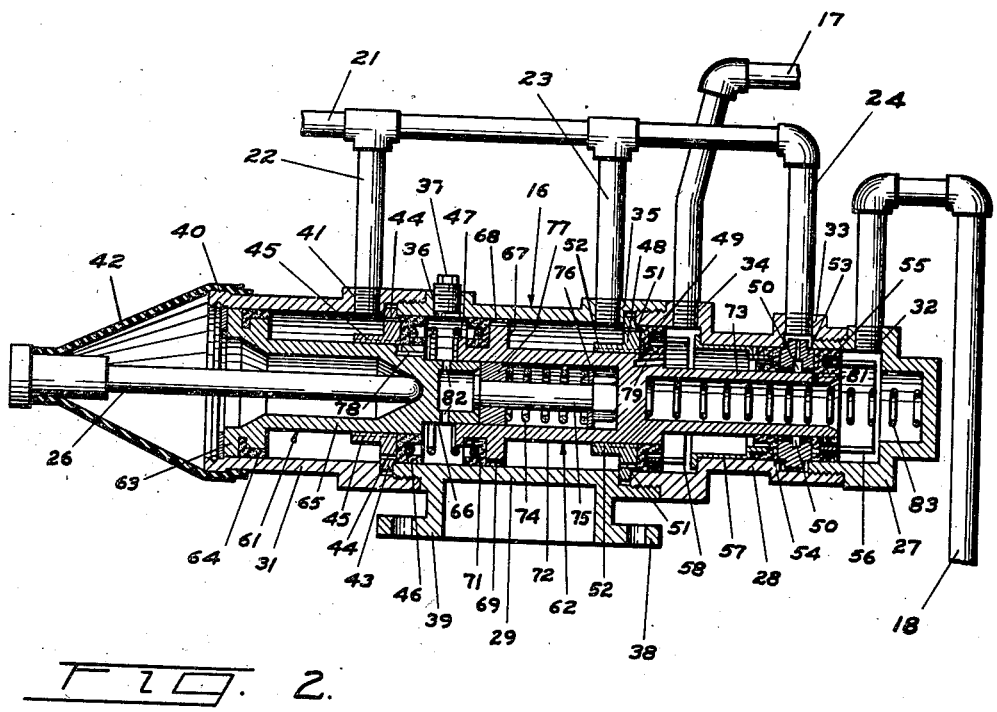
Figure 2 is a view in vertical section and on an enlarged scale showing the master cylinder of Figure 1 in detail.

The master cylinder 16 serves as a combined master cylinder and hydraulic power multiplying device and is shown more clearly in Figure 2. The casing thereof comprises mainly four cylindrical castings screwed to each other and designated in order from the front of the cylinder to the rear as 27, 28, 29, and 31. The casting 27 has formed therein a tapped bore 32 connected through the conduit 18 with the forward wheel cylinders. The casting 28 is formed with tapped bores 33 and 34 which are connected respectively by means of the branch conduit 24 with the reservoir 19 and by means of the line conduit with the rear wheel cylinders.

The casting 29 is formed with tapped bores 35 and 36, the former of which is connected by the branch conduit 23 with the reservoir 18 and the latter of which is during normal operation closed by a plug 37 which however, may be removed for bleeding the system. The casting 29 is also formed with lugs 38 and 39 by which the cylinder may be secured to the chassis. The casting 31 is formed with a tapped bore 41 which is connected through the branch conduit 22 with the reservoir 19. The rear end of the cylinder formed by the rear end of the casting 31 is closed by a rubber boot 42 which is secured to a flange 40 on the rear end of the casting 31 and to the piston rod 26.

The cylinder is divided into a plurality of separate compartments by means of several annular heads secured therein and by means of a pair of plungers slidably mounted therein. Secured in an annular groove formed between the castings 29 and 31 and thus fixedly fastened when the castings are secured together is an annular head 43 provided with a series of ports such as 44 and with series of grooves such as 45. Preferably, we provide at least eight such ports in each of the annular heads. Positioned in advance of the head and facing forward is an annular cup packing 46 for controlling the flow of liquid past the head. The packing 46 is held in place by liquid pressure and by a spring 47, which may if desired have a strength of about 5 pounds.

Fixedly secured in a similar annular groove formed between the castings 28 and 29 is an annular head 48 with which there is similarly associated an annular cup packing 49 and which is formed with a plurality of ports such as 51 and with a plurality of grooves such as 52.

Similarly secured between the castings 27 and 28 is an annular head 53 which is not fastened so tightly as the heads 43 and 48. Thus the head 53 may move slightly to equalize the front and rear pressures and is formed with a plurality of connected ports 50 at least one of which is connected with the bore 33 and thus with the reservoir 19. Associated with the head 53 is a rearwardly facing cup packing 54 and a forwardly facing cup packing 55 which serve to allow fluid to pass rearwardly and forwardly from the head 53 but prevent the return of liquid to the reservoir during the operating stroke. The cup 55 is maintained in place by liquid pressure and the tubular member 56, and the cup 54 is maintained in place by liquid pressure and by an annular stamping 57 and the tubular member 58, the latter also serving together with liquid pressure for holding the cup 49 in place. The above described elements comprise the substantially fixed portions of the master cylinder 16.

Slidably mounted in said relatively fixed portions are the movable portions which consist mainly of the plungers 61 and 62. Each of these plungers have portions which serve as two or more pistons for the displacement of liquid from the various compartments of the cylinder. Thus the plunger 61 has a rear head 63 with which there is associated a sealing cup 64. Moreover, the plunger 61 has a forwardly extending concentric projection 65 of smaller diameter which passes through the head 43 and the cup 46 and thus serves as a piston. Forward of the projection 65 is another forwardly extending concentric projection 66 of still smaller diameter provided for purposes later to be more fully described.

The plunger 62 has a rear head or piston 67 annular in shape provided with ports such as 68 and 69 and with an annular cup packing 71 against which the front end of the spring 47 bears. Plunger 62 also has a concentric forwardly extending projection 72 of smaller diameter which serves as a piston passing through the head 48 and the cup 49. Furthermore the plunger 62 has a still forwardly extending concentric projection 73 of still smaller diameter which serves as an annular piston extending through the head 53 and the cups 54 and 55. The area of the projection or piston 73 should substantially equal the area of the annular projection or piston 72 and may be equal to or even greater than the area of the wheel cylinder pistons. The area of the piston 67 may be approximately four times the area of the projection or piston 65.

The plunger 61 is operated directly by the pedal 25 but the plunger 62 is not directly secured to the pedal being operated indirectly through the plunger 61. Between the plungers there is provided a spring 74 guided upon a bolt 75, the bolt being slidably supported in and the spring being maintained between the slotted washers 76 and 77 and the washer 77 bearing on the extension 66. During the low pressure phase the two plungers operate as a unit through the connection afforded by the spring 74 which may if desired have a strength of about 125 pounds. During the high pressure phase, the spring compresses and liquid trapped between the pistons 65 and 67 transmits pressure hydraulically from the plunger 61 to the plunger 62 in addition to the pressure transmitted by the spring. Due to the fact that the area of the rear piston 65 is smaller than the area of the piston 67, the plunger 62 moves more slowly than the plunger 61 and therefore much higher pressures are exerted on the plunger 62.

As may be clearly seen in Figure 2, the forward end of the concentric portion 65 of the piston 61 is directly back of the rear end of the piston 62. By reason of this arrangement as well as by reason of the length of the bolt 75, movement of the piston 61 relative to the piston 62, is limited. If at any time the forward end of the portion 65 should contact with the rear end of the piston 62, the pistons would form in effect a solid piston so that regardless of the amount of forward pressure exerted on the rear piston they would move as a unit. The distance between said front end of the portion 65 and the rear end of the piston 62 is arranged, however, so that the additional pressure (which it is possible to develop by differential movement of the pistons) when added to the pressure developed by the pistons working as a unit through the first part of the stroke, is slightly greater than the pressure required to exert maximum braking effort on the vehicle.

The arrangement disclosed and described serves as a safety device. Even should the spring 74 break, yet the same maximum braking effort would be possible. In such an emergency the first part of the pedal travel would cause the piston 61 to move faster than the piston 62, while during the last part of the pedal travel, the two pistons would move as a unit. The final result would be the same for the full pedal stroke in both cases. The two pistons would be moved finally to the same point in both the normal and emergency operations. It is true that the pedal pressures required would be much greater in the emergency operation, but under such circumstances the increased pedal pressures would not be objectionable.

In order to allow the system to adjust itself automatically for temperature changes, while in the normal brake off position, passages are provided through several of the pistons, the passages being open in the brake off position but being closed during the operating stroke. Thus the piston 65 is provided with the passage 78, the piston 72 with the passage 79; and the piston 73 with the passage 81. Openings 82 are also provided in the extension 66 to allow the free passage of liquid. In order to insure the quick return of the plungers a spring 83 is positioned in front of the piston 73. This spring may if desired have a strength of about 25 pounds.

In the operation of the above described system, pressure exerted on the pedal 25 forces the plunger 61 forward and through the spring 74 also forces the plunger 62 forward, thus causing liquid to pass through the bores 32 and 34 and to the front and rear brake cylinders to apply the front and rear brakes respectively. Inasmuch as the area of the piston 67 is greater than the area of the piston 65, the space between the two is enlarged as the two pistons move forward in unison. The suction created thereby causes liquid to be drawn into said space through the ports 44 and 68 and past the cups 46 and 71.

As soon as the application of the brakes to the drums encounters sufficient resistance to overbalance the pressure of the spring 74, the piston 65 begins to move faster than the piston 67 and thus builds up pressure upon the liquid trapped between the two pistons thus exerting a multi- plied pressure upon the piston 67. The piston 67 acts through the plunger 62 upon the brake applying liquid being forced to the respective wheel cylinders. Thus during the initial phase of operation the pedal acts through the relatively low leverage afforded by the pedal itself upon the brake applying liquid and therefore quickly takes up the slack. When the slack is taken up, or thereafter when the line pressure is built up to the predetermined magnitude, the pressure created causes the compression of the spring 74 and a shift to the high pressure phase of operation. In the high pressure phase of operation, the pedal acts upon the brake applying fluid through a relatively high leverage. This high leverage is obtained because the mechanical ratio of the pedal leverage is multiplied by the leverage of hydraulic booster.

When the pressure on the foot pedal is released, the forces exerted by the return springs act through the liquid on the piston 73 and on the piston 72 and thus force the plunger 62 rearwardly. Inasmuch as fluid is trapped between the two plungers under fairly high pressure, pressure is transmitted through said trapped fluid as well as through the spring 74 to the plunger 61, and the plunger 61 is forced back to its inactive position as shown in Figure 2. Because of the increased amount of fluid trapped between the plungers, the plunger 61 may during the latter part of the return stroke, move away from contact with the washer 77 but will be forced continuously rearward to the position shown by the pressure exerted by said trapped fluid. When the plunger 61 reaches its inactive position, the fluid trapped between the plungers escapes through the ports 78 and through grooves 45. Any desired number of these grooves and ports may be provided to insure the quick escape of the fluid and the quick release of the brake. Thereupon the plunger 62 returns to its normal inactive position shown and pressures in the lines 17 and 18, the wheel cylinders, and the reservoir 19 are equalized through the ports 81 and 82 and through the ports 50 and the grooves 52.

Figure 3:
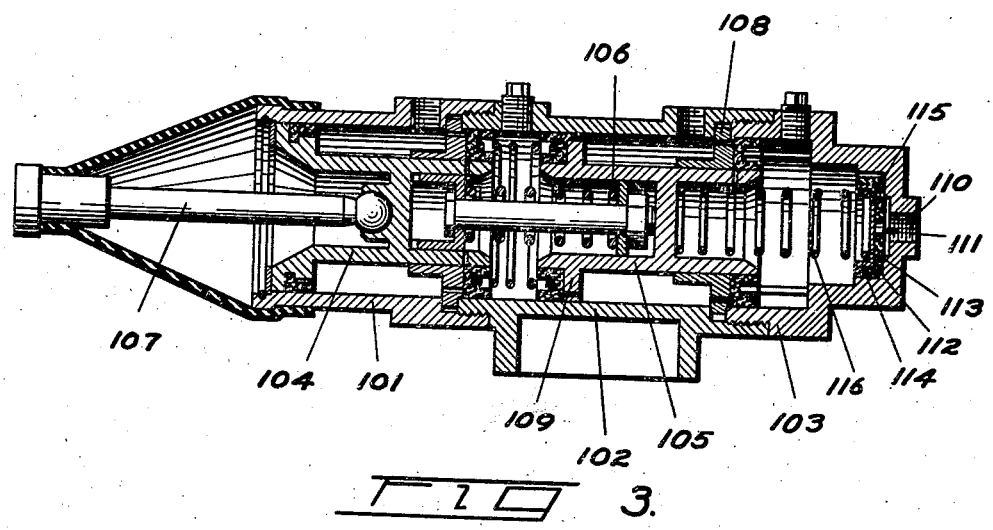
Figure 3 is a view similar to Figure 2 showing a modified form of master cylinder more simple in construction but one not capable of separate dual braking.

In Figure 3, there is shown an application of the invention to a cylinder of the single type instead of one of the dual type. Therein a cylinder formed of castings 101, 102, and 103 (castings 101 and 102 corresponding substantially to castings 31 and 29) is provided with a pair of plungers 104 and 105 (the former corresponding in function and design to the plunger 61). Interposed between the plungers 104 and 105 is a spring 106 and connected to the rear plunger 104 is a piston rod 107 (corresponding respectively in design and function to the spring 74 and the rod 26). Interposed between the casting 102 and 103 is an annular fixed head 108 through which the forward portion of the plunger 105 extends. The plunger 105 is formed with a rear head or piston 109 but instead of being formed like plunger 62, the plunger 105 is similar to plunger 104 in that it has a forwardly extending projection of substantially uniform diameter throughout.

The cylinder formed by the castings 101, 102, and 103 does not have separate outlets for the front and rear brakes but is provided with a single concentric outlet 110 leading to all of the brakes. The outlet 110 is provided with a valve 111 which allows the free passage of liquid forward but is spring loaded to maintain the liquid ahead of the valve under a predetermined pressure. The valve comprises an annular rubber cup 112 formed with a circular groove 113; a flanged metallic disk 114 provided with a series of holes 115 registering with a groove 113; and a spring 116 bearing upon the disk 114.

The operation of the cylinder illustrated in Figure 3 is similar to that illustrated in Figure 2. However, the fluid forced to the brakes passes through holes 115 distorting the inner edge of the cup 112 and out the outlet 110. On the return, the liquid is trapped ahead of the valve until sufficient differential pressure is developed to overcome the spring 116 and lift the entire valve 111 away from the outlet. Thereupon the liquid returns to the cylinder around the outside of the valve 111.

Figure 4:
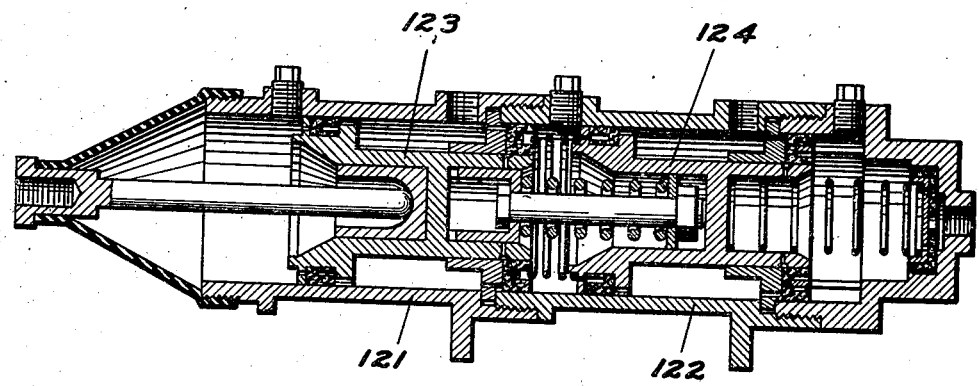
Figure 4 is a view similar to Figure 3 showing a modified form of cylinder very like that shown in Figure 3.

The cylinder shown in Figure 4 is substantially the same as that shown in Figure 3. However, the castings 121 and 122 thereof are identical and the plungers 123 and 124 are identical, thus allowing great economy in the production of cylinders of this type.

In Figures 5 and 6, we have shown a hydraulic booster cylinder interposed in a mechanical linkage. Therein, a pedal 131 is connected to a piston rod 132 which through a boster cylinder 133 and a rod 134 operates a cross shaft 135 to apply the front and rear brakes through tension links 136 and 137 respectively. A reservoir 138 supplies fluid through conduit 139 to ports 141 and 142 of the cylinder 133. A plunger 144 formed with a rear head 146 has a forward piston 147 which extends through an annular fixed head 148. A plunger 149 is positioned in advance of the plunger 144 and a spring 150 is interposed between the plungers. The plunger 144 is actuated by the piston rod 132 and the plunger 149 acts on the rod 134.

In Figure 7, we have shown a hydraulic booster adapted to be interposed in an existing hydraulic brake system. Therein the cylinder 151 is provided with the plungers 152 and 153 and a spring 154 is interposed between the plungers. An inlet opening 155 is connected to any suitable source of fluid under pressure such as a master cylinder and this fluid acts upon the rear of plunger 152 and through said plunger 152, the spring 154, and the liquid trapped between the plungers acts upon the plunger 153 in a manner similar to that previously described. Liquid ahead of the plunger 153 is forced to the brakes through outlet opening 155 in a manner similar to that described above in connection with previously described embodiments.

In Figure 8, we have shown a master cylinder similar to that shown in Figure 3. A single casting, however, forms not only the cylinder proper 162, but also the reservoir 163 and the rear fixed head 164. The valve 165 is modified somewhat, being formed of an annular rubber cup 166 and a metallic disk 167 provided with the central projection 168. The valves 111 and 165 are described and claimed in a co-pending application of Eugene G. Carroll, Serial No. 602,328.

In Figure 9 there is illustrated a casting 171 corresponding to the casting 162 but instead of being formed with an integral head such as the head 164 is formed with an internal circumferential groove 175. An annular head 176 is formed with an external circumferential groove 177 which is designated to complement the groove 175. A spring ring 178 is provided and is arranged in the two grooves and thus serves to hold the head in proper position in the cylinder.

It is to be understood that the above described embodiments of our invention are for the purpose of illustration only and various changes may be made therein without departing from the spirit and scope of the invention.

We claim:

1. In a power multiplying device, a cylinder, an operating plunger in said cylinder having a power receiving face, an operator plunger in said cylinder having a power delivering face of an area smaller than the area of said power receiving face and means for transmitting pressure from one piston to the other comprising a spring interposed between said faces movable bodily with said plungers and bearing at one end on one of said plungers and on the other end on the other of said plungers.

2. In a power multiplying device, a cylinder, an operating plunger in said cylinder having a power receiving face, an operator plunger in said cylinder having a power delivering face of an area smaller than the area of said power receiving face means for transmitting pressure from one piston to the other comprising a spring interposed between said faces movable bodily with said plungers and bearing at one end on one of said plungers and the other end on the other of said plungers, and means for preventing the escape of fluid from the space between the plungers when the plungers are being operated.

3. In a hydraulic brake system; a cylinder; a forward fixed head in said cylinder; a rear fixed head in said cylinder; a plunger formed with large diameter piston mounted in said cylinder and provided with a forwardly extending projection extending forward through said forward fixed head and having a forward face forming a piston of a comparatively small area relative to the area of said large diameter piston; a second plunger positioned rearward of said first plunger, provided with a portion extending through said rear fixed head, and having its forward face shaped to form a piston of small area relative to said large diameter piston.

4. In a hydraulic brake system, a cylinder, a plunger formed with a large diameter rearwardly facing piston and with a forwardly extending projection having a forward face forming a piston of a relatively small area, and a second plunger positioned rearward of said first plunger and having its forward face forming a piston of small area relative to the area of said large diameter piston.

5. In a hydraulic brake system, a cylinder having a front end and a rear end, a forward fixed head within said cylinder spaced from said front end, a rear fixed head within said cylinder spaced from said rear end, a plunger mounted in said cylinder and provided with a forwardly extending projection extending through said forward fixed head, a second plunger extending through said rear fixed head and means for preventing passage of fluid forward past said forward plunger.

6. In a brake system for an automotive vehicle, a brake pedal, mechanical connections extending from said pedal to the brakes of said vehicle and a hydraulic power multiplying device interposed in said mechanical connections including a relatively large diameter piston and a relatively small diameter piston, and means responsive to the development of brake applying pressure to a certain predetermined point for varying the ratio of force applied to the pedal to force applied for energizing the brakes, by a factor representing the ratio of the areas of the respective pistons to each other.

7. In a fluid brake system a foot pedal; a brake; means which include fluid pressure connections between said pedal and said brake and which is responsive to relatively low pressures exerted upon said pedal for applying said brake at pressures bearing a predetermined ratio to the pressure exerted on said pedal; means responsive to a predetermined higher pressure exerted in applying said brake for changing said ratio and for causing additional increments of pedal pressure above that required at the first mentioned ratio to produce said predetermined higher brake applying pressure, to produce additional increments of brake applying pressure at a greater predetermined ratio while maintaining at the same time the predetermined brake applying pressure at the first mentioned predetermined ratio.

8. In a fluid brake system a cylinder formed with a circumferential groove, a pair of plungers in said cylinder, a spring interposed between said plungers, an annular head through which one of said plungers passes formed with an external circumferential groove, and a spring positioned in both of said grooves.

9. In a fluid brake system, a cylinder formed with an internal circumferential annular flange, a pair of plungers in said cylinder, one of which passes through said flange, a spring interposed between and bearing on both of said plungers, and means for trapping fluid between said plungers whereby movement of one of said plungers toward the other creates pressure on the other through the spring and also through the trapped fluid.

10. In a hydraulic brake system, a cylinder, a pair of plungers positioned in said cylinder, a spring interposed between said plungers, means for actuating one of said plungers, and a headed bolt disconnected from said actuating means and surrounded by said spring and serving as a guide for maintaining said spring against buckling and for maintaining said spring under a predetermined degree of compression, the means for actuating the plunger being connected directly to the plunger actuated thereby.

11. In a hydraulic brake system, a cylinder, an operating plunger in said cylinder having a power delivering face and having a power receiving face of larger area than said power delivering face, an operator plunger in said cylinder having a power delivering face with an area smaller than the area of said power receiving face, a liquid reservoir, and means for delivering liquid at times from said reservoir to a portion of said cylinder in which the liquid contacts with the power delivering face of the operating plunger and in which the liquid contacts with the power receiving face of the operating plunger.

12. In a hydraulic brake system, a cylinder, a plunger formed with a large diameter face facing rearward and with a face of relatively smaller area facing forward, and a second plunger positioned rearward of the first plunger and having a forward face of a smaller area relative to the area of the rearward face of the first named plunger.

13. In a fluid brake system, a cylinder, a plunger of relatively large size in said cylinder, a plunger of relatively small size in said cylinder, a spring interposed between said plungers, an annular head through which the smaller of said plungers passes, and means for at times trapping fluid including packing cups associated with the plungers and facing toward each other between said plungers.

14. In a hydraulic brake system, a cylinder, an operating plunger in said cylinder having a power delivering face and having a power receiving face of larger area than said power delivering face, and an operating plunger in said cylinder having a power delivering face with an area smaller than the area of said power receiving face.

EUGENE G. CARROLL.
JEROME R. COX.